United States Patent
Waldorf et al.

(10) Patent No.: US 7,644,197 B1
(45) Date of Patent: Jan. 5, 2010

(54) QUEUE MANAGEMENT BY MULTIPLE PROCESSORS

(75) Inventors: Jerry A. Waldorf, Woodland Hills, CA (US); Frank Kieviet, Irvine, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 679 days.

(21) Appl. No.: 10/871,590

(22) Filed: Jun. 17, 2004

Related U.S. Application Data (60) Provisional application No. 60/511,864, filed on Oct. 15, 2003.

(51) Int. Cl.
*G06F 3/00* (2006.01)

(52) U.S. Cl. .............................. 710/21; 710/7; 710/105; 710/305

(58) Field of Classification Search .................. 710/36, 710/40, 52, 21, 7, 105
See application file for complete search history.

(56) References Cited

U.S. PATENT DOCUMENTS

| | | | |
|---|---|---|---|
| 6,070,209 A * | 5/2000 | Hausauer ..................... 710/104 |
| 6,157,963 A * | 12/2000 | Courtright, II et al. ......... 710/5 |
| 6,230,219 B1 * | 5/2001 | Fields et al. .................. 710/22 |
| 6,349,361 B1 * | 2/2002 | Altman et al. ............... 711/121 |
| 6,484,224 B1 * | 11/2002 | Robins et al. ................ 710/305 |
| 6,681,270 B1 * | 1/2004 | Agarwala et al. ............. 710/40 |
| 6,789,147 B1 * | 9/2004 | Kessler et al. ................ 710/200 |
| 6,920,534 B2 * | 7/2005 | Dover ......................... 711/151 |
| 6,963,962 B2 * | 11/2005 | Ramagopal et al. ......... 711/169 |
| 6,976,135 B1 * | 12/2005 | Talbot et al. ................. 711/151 |
| 2002/0143847 A1 * | 10/2002 | Smith .......................... 709/103 |
| 2003/0065843 A1 * | 4/2003 | Jones et al. .................. 710/107 |
| 2003/0126336 A1 * | 7/2003 | Creta et al. .................. 710/305 |
| 2003/0233503 A1 * | 12/2003 | Yang et al. ................... 710/100 |
| 2005/0081202 A1 * | 4/2005 | Brokenshire et al. ........ 718/100 |

* cited by examiner

*Primary Examiner*—Alford W Kindred
*Assistant Examiner*—Ernest Unelus
(74) *Attorney, Agent, or Firm*—Osha • Liang LLP (57) ABSTRACT

Methods and apparatus, including computer program products, implementing and using techniques for processing an ordered sequence of elements in one or more queues. A first element is received from a queue at a first processor. The first element is processed during a first processing time. A second element is received from a queue at a second processor. The second element is processed during a second processing time. The first and second processed elements are committed serially to a write queue, such that a temporal order between the first and second elements in the queues is maintained regardless of the durations of the first and second processing times.

24 Claims, 5 Drawing Sheets

| Time | Processor 1 (Session 1) | Processor 2 (Session2) |
|---|---|---|
| 0 | Receive Order from Read Queue | |
| 1 | -- convert Order -- | Receive Cancellation from Read Queue |
| 2 | -- convert Order -- | Send Converted Cancellation to Write Queue |
| 3 | -- convert Order -- | Call commit() |
| 4 | -- convert Order -- | -- wait -- |
| 5 | Send Converted Order to Write Queue | -- wait -- |
| 6 | Call commit() | -- wait -- |
| 7 | commit() is done, OK | -- wait -- |
| 8 | | commit() is done, OK |

FIG. 3

| Time | Processor 1 (Session 1) | Processor 2 (Session2) |
|---|---|---|
| 0 | Receive Order from Read Queue | |
| 1 | -- convert Order -- | Receive Cancellation from Read Queue |
| 2 | -- convert Order -- | Send Converted Cancellation to Write Queue |
| 3 | -- convert Order -- | Call commit() |
| 4 | -- convert Order -- | -- wait -- |
| 5 | Send Converted Order to Write Queue | -- wait -- |
| 6 | Call rollback() | -- wait -- |
| 7 | rollback() is done, OK | -- wait -- |
| 8 | | Server will rollback; commit() is done, FAIL (throws exception) |

QUEUE MANAGEMENT BY MULTIPLE PROCESSORS

CROSS-REFERENCE TO RELATED APPLICATIONS

This application claims the benefit of U.S. Provisional Application No. 60/511,864, filed on Oct. 15, 2003, which is incorporated by reference herein.

BACKGROUND

This invention relates to processing of data elements.

Abstract Data Types (ADTs) are data types that are described in terms of the operations the ADTs support rather than how the ADTs are implemented. One example of an ADT is a first-in, first-out (FIFO) queue. A FIFO queue manages (e.g., processes) program work requests stored therein so that the oldest request is always processed before any other requests are processed. Another ADT is a LIFO (last-in, first-out) stack. LIFO stacks process a most recent request before any other requests are processed (i.e., the oldest request does not get handled until there are no other remaining requests in the stack).

SUMMARY

In one aspect, the invention provides methods and apparatus, including computer program products, implementing and using techniques for processing an ordered sequence of elements in one or more queues. A first element from one or more queues is received at a first processor. The first element is processed during a first processing time of a first duration to generate a first processed element. A second element from the one or more queues is received at a second processor. The second element is processed during a second processing time of a second duration to generate a second processed element. The first and second processed elements are committed serially to a write queue, such that a temporal order between the first and second elements is maintained regardless of the durations of the first and second processing times.

Implementations of the invention can include one or more of the following advantageous features. The first and second elements can be received from a same queue. The first and second elements can be received from different queues, and committing can include determining whether there are elements in the one or more queues that precede the first element in the temporal order. The first and second processed elements can be committed serially to the write queue only if there are no elements in the one or more queues that precede the first element in the temporal order. Committing can include monitoring the committing of the first and second elements to determine whether a committing operation has failed. If a committing operation has failed, an exception can be thrown for an associated processed element.

The first and second elements can be electronic data interchange messages. The electronic data interchange messages can represent one or more of: orders and cancellations. The write queue can be an enterprise resource planning queue. A deadlock situation can be detected, in which two or more processed elements are blocked from being written to the write queue and an exception can be thrown if a deadlock situation is detected. Each processor can process only one element per transaction. The write queue can be a database.

A locking key property can be identified for each of the received first and second elements, and if the first and second elements have a predetermined locking key property, the first and second processed elements can be committed serially to the write queue, such that a temporal order between all processed elements with the predetermined locking key property in the write queue is maintained regardless of the durations of the first and second processing times.

In another aspect the invention provides methods and apparatus, including computer program products, implementing and using techniques for processing an ordered sequence of elements in one or more queues. A first element is received from a queue at a first processor. The first element is processed during a first processing time to generate a first processed element. The first processed element is committed to a write queue. A second element is received from a queue at a second processor after the first processed element has been committed to the write queue. The second element is processed during a second processing time to generate a second processed element. The second processed element is committed to the write queue, such that a temporal order between the first processed element and the second processed element is the same as the temporal order between the first element and the second element.

The invention can be implemented to realize one or more of the following advantages. The use of multiple processors for processing messages in a queue ensures significant performance gains. The processing methods used by each processor ensure that the elements in a queue are kept in a same temporal order before and after processing. The queues can be in a single server or in different servers and the temporal order of elements within a single queue, or between multiple queues, can be maintained after processing. The queue management system can be implemented on a client, or on a server that serves multiple clients.

The details of one or more embodiments of the invention are set forth in the accompanying drawings and the description below. Other features and advantages of the invention will become apparent from the description, the drawings and the claims.

DESCRIPTION OF DRAWINGS

Like reference symbols in the various drawings indicate like elements.

DETAILED DESCRIPTION

A queue management system manages messages. The queue management system receives and holds messages from message producers and distributes the messages to message consumers. The message producers write messages to a specified destination in the queue management system. A consumer can obtain a message from a destination, either by receiving the message or by retrieving the message, which will be referred to herein simply as "reading a message." After a consumer reads a message, the consumer can commit or rollback the message. Commit or rollback is a synchronous signal from the consumer to the queue management system. Committing a message acknowledges receipt of a message, at which point the message is marked as "processed." Messages marked as processed are typically not read by consumers again. Rolling back a message makes a message available for reading by consumers again. In one implementation, the queue management system organizes messages written by producers in two major ways: the messages can either be read and committed once, that is, the queue management system works as a point-to-point system. Alternatively, the messages can be read and committed once by each subscriber who has expressed an interest in the message, that is, the queue management system works as a publish-subscribe system. Implementations of the queue management system will now be described in further detail with reference to the attached drawings.

Figure 1:
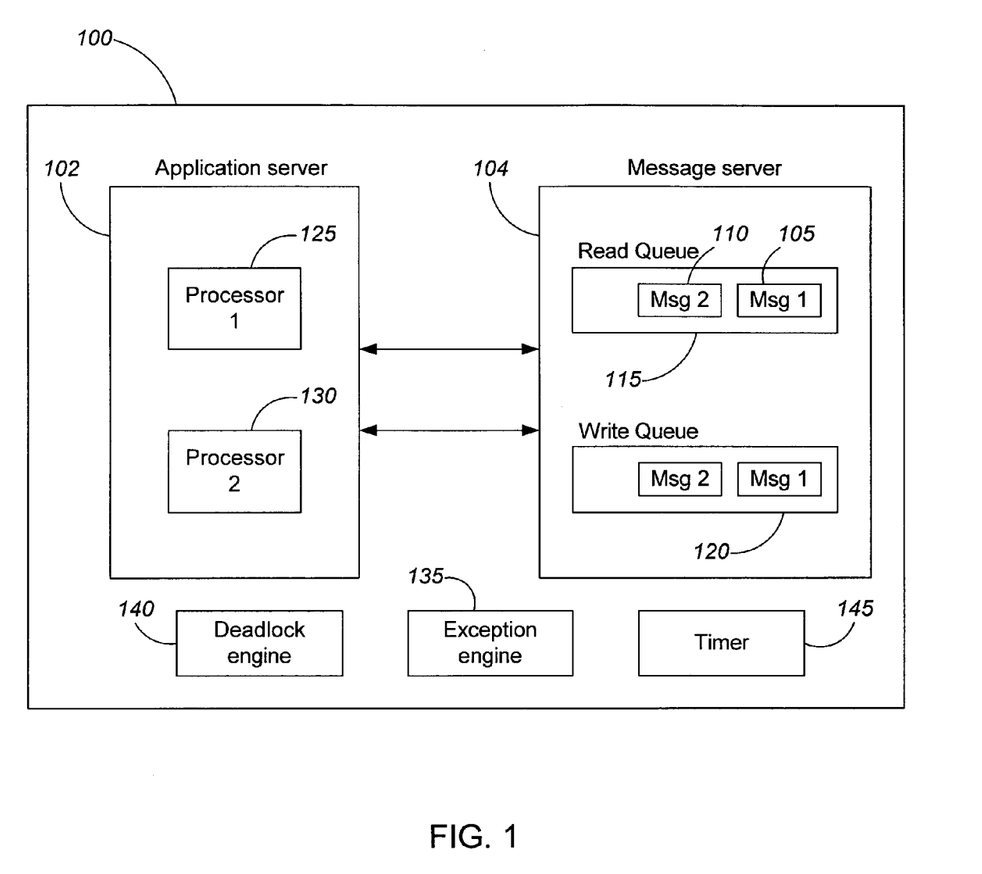
FIG. 1 shows a system for processing messages in a read queue and writing the processed messages to a write queue.

As can be seen in FIG. 1, a queue management system (100) includes an application server (102) and a message server (104). The queue management system (100) can be part of a larger system, such as, an application service or a web service that receives orders and cancellations through the Internet.

The queue management system (100) can expose a Java™ Message Service (JMS) interface. JMS is an application program interface for accessing enterprise messaging systems from Java programs, developed by Sun Microsystems of Mountain View, Calif. Java supports programming for the Internet in the form of platform-independent Java "applets." In particular, the Java 2 Platform, Enterprise Edition (J2EE) provides standardized, modular components, which ensures portability of applications across enterprise systems capable of supporting J2EE.

JMS uses a session object for managing, generating and consuming messages. A session serves several purposes, one of which is to support a single series of transactions that combine work spanning producers (e.g., the message server) and consumers (e.g., the application server) into atomic units (e.g., messages). The session defines a serial order for the messages that are consumed and the messages that are produced. The session retains consumed messages until the messages have been acknowledged, and can create and service multiple message producers and consumers. Once a connection has been started, any session with one or more registered message listeners (e.g., the application server (102)) is dedicated to a thread of control from which messages are received. As a rule, client code cannot use a session or any objects from another thread of control. The only exception to the rule is a close method, which is the only session method that can be called while another session method is being executed in another thread.

A session may be specified as a transacted session. Each transacted session supports a single series of transactions. Each transaction groups a set of message send operations and a set of message receive operations into an atomic unit of work, and thus organizes a session's input message stream and output message stream into series of atomic units. When a transaction commits, the transaction's atomic unit of input is acknowledged and the transaction's associated atomic unit of output is sent. If a transaction rollback is performed, the transaction's output messages are destroyed and the session's input is automatically recovered. The content of a transaction's input and output units is simply those messages that have been produced and consumed within the session's current transaction.

A transaction is completed using either the transaction session's commit method or the transaction session's rollback method. The completion of a session's current transaction automatically begins the next transaction. The result is that a transacted session always has a current transaction within which the transaction's work is done. A Java Transaction Service (JTS) or some other transaction monitor may be used to combine a session's transaction with transactions on other resources (e.g., databases or other JMS sessions).

When a business event occurs, one or more messages are sent to the queue management system (100), the messages are processed by the queue management system (100), and can be passed on to another external business application (e.g., one that subscribes to the message). In the queue management system (100), when a message is received (e.g., an electronic data interchange (EDI) message), the message server (e.g., JMS) (104) places the message (105, 110) in a read queue (115). The messages in the read queue (115) typically, but not necessarily, have a temporal order that can be maintained, as will be discussed below.

The application server (102) processes the messages in the read queue (115). In order to increase the throughput of the application server (102), the processing of the messages can be performed concurrently. The application server (102) in the implementation shown in FIG. 1 includes two processors (125,130) for processing the messages in the read queue (115). Typically, the number of processors in the application server is larger and is chosen based on what type of processing tasks the application server is to perform.

When processing has been completed, the application server (102) sends the processed messages back to the message server (104). More specifically, the processed messages are written to a write queue (120) in the message server (104). In the implementation shown in FIG. 1, the processed messages in the write queue (120) have the same order as the unprocessed messages in the read queue (115). Once the processed messages have been placed in the write queue (120), the processed messages are accessible for further processing by other components of the system.

In one implementation, the message server (104) determines when a message should be read from the read queue (115) by the application server (102). Exactly how the determination is performed varies depending on the mode in which the message server and application server operate, which will be described in further detail below. The application server (102) and message server (104) can communicate over conventional communication pathways, such as a computer network, or be integrated into one physical unit. Furthermore, in other implementations, the read queue (115) and the write queue (120) may not reside on the same message server (104), as will be seen below. The read queue (115) and/or the write queue (120) can be format databases, queues, other data structures, or combinations of such.

Figure 2:
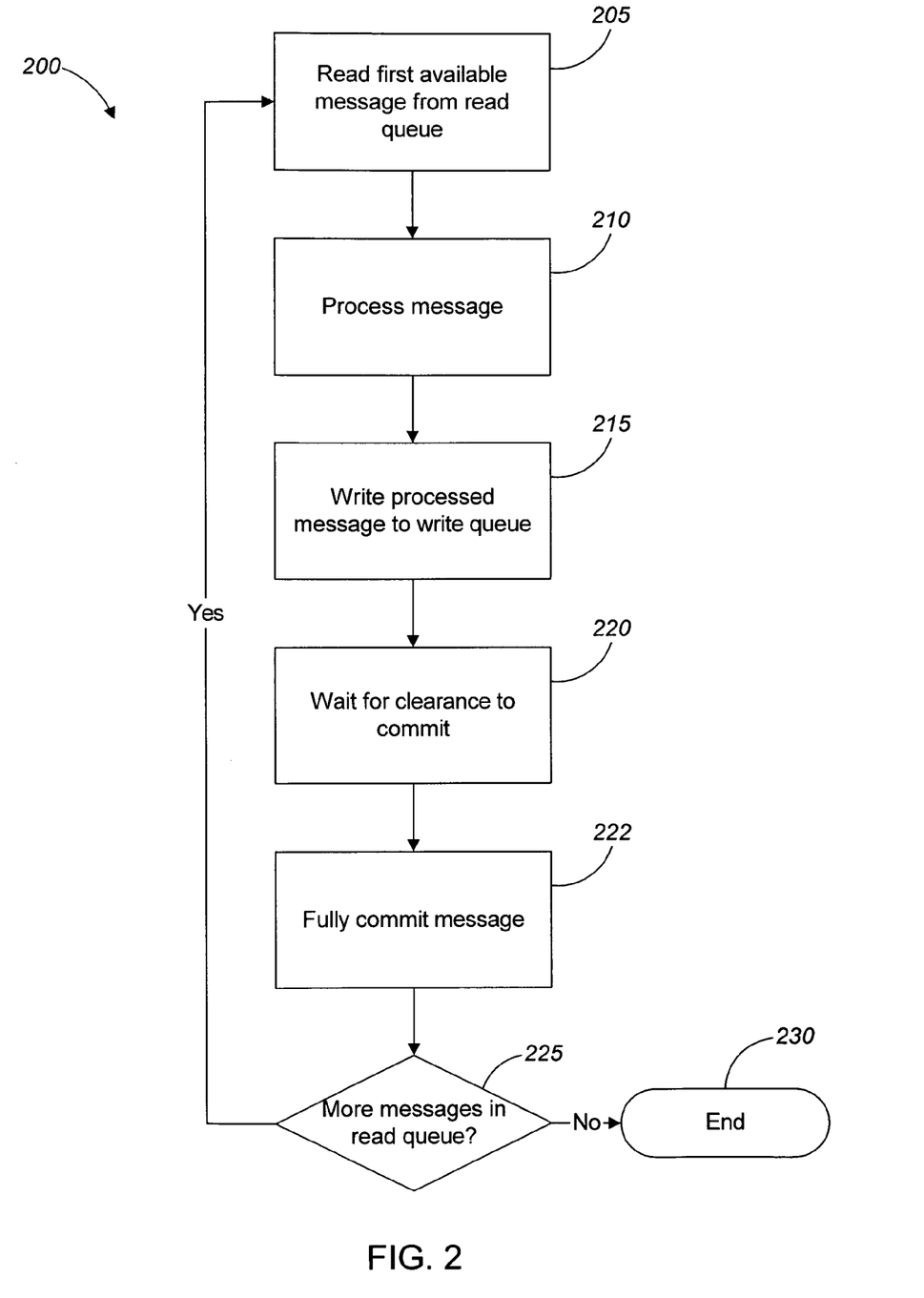
FIG. 2 shows a flowchart of the operation of the processors of FIG. 1.

FIG. 2 shows a flowchart of an operation of one of the processors (125, 130) of the application server (102) of FIG. 1. A processor starts by reading (e.g., receiving or retrieving) a first available message from the read queue (115) in the message server (104) (step 205). The processor can be prompted to accept a message or can retrieve the message when the processor is ready. When the processor has retrieved the message, the processor processes the message (step 210). The type of processing and the processing time for an individual message can differ depending on the type of message. One example of message processing is to convert messages from a first format into a second format (e.g., converting XML messages to messages of an ERP native format). Other processing examples include application functions and the application of business logic to the messages (e.g., converting a first currency in a purchase order into a second currency).

After completion of processing the message, the processor writes the message to the write queue (120) in the message server (104) (step 215). Writing to the write queue (120) can be temporary, so the processor can wait for a confirmation prior to fully committing the processed message (step 220). The details of how the confirmation occurs differs depending on different systems and processing modes, and are described in further detail below. After the processor receives a confirmation, the processed message is fully committed (step 222). The processor then checks to see whether there are any remaining messages in the read queue (110) (step 225). If there are more messages in the read queue (110), the processor returns to step 205 and performs steps 205-225 again for the next available message in the read queue (110). If there are no more messages in the read queue (110), the process ends (step 230).

In one implementation, the queue management system (100) offers three different operating modes. The three operating modes are the Fully Concurrent FIFO Mode, the Protected Concurrent FIFO Mode, and the Fully Serialized FIFO Mode. Each of the operating modes will be described below in further detail.

Fully Concurrent FIFO Mode

In the Fully Concurrent FIFO Mode, several messages in the read queue are processed concurrently by several processors. The first processor (125) in the application server (102) reads the first message (105) from the read queue (115) in the message server (104) and starts processing the message. Before the processing is complete, the second processor (120) reads the second message (110) from the read queue (115) and starts processing the second message. The processors output processed messages to the write queue (120) in the message server (120) as soon as the respective messages have been processed. Consequently, in the Fully Concurrent FIFO Mode, the order of the messages in the read queue (115) cannot be guaranteed to be maintained in the write queue (120). Because several of the processors (125, 130) in the application server (102) work concurrently in the Fully Concurrent FIFO Mode, the Fully Concurrent FIFO Mode is typically the fastest mode for processing messages in the read queue (115).

For the reasons discussed above, the Fully Concurrent FIFO Mode may not be useful for read queues where the order of the messages in the read queue are important, for example, if the messages in a read queue represent orders and cancellations. However, if the queue management system (100) is organized such that the read queue only contains elements for which the order is immaterial, for example, messages of the same type (e.g., purchase orders only), the Fully Concurrent FIFO Mode can be an appropriate processing mode for processing messages in the read queue (115).

Protected Concurrent FIFO Mode

Generally stated, in the Protected Concurrent FIFO Mode, the consumers read messages from a destination in the queue management system in a well-defined sequence. The Protected Concurrent FIFO Mode allows a message to be read before a previous message in the sequence is read-committed. Thus, multiple message can be processed concurrently by multiple consumers. The queue management system serializes the read-commit signals such that the sequence of read-commit signals is the same as the original sequence. In one implementation, the serialization of the read-commit signals is achieved by blocking the read-commit signal for a particular message until all previous messages in the sequence have been read-committed.

The Protected Concurrent FIFO Mode also provides mechanisms for handling rollbacks, deadlocks, and timeouts, as will be seen below. If a message is rolled back, the queue management system can respond by failing blocked read-commits of subsequent messages. If the queue management system detects a deadlock situations, the queue management system can respond by failing any blocked read-commits. If a consumer does not send a read-commit after a predefined time after reading a message, the queue management system can respond by failing read-commit signals that were blocked by the message. All of these features of the Protected Concurrent FIFO Mode will now be described in further detail.

As can be seen above, in the Protected Concurrent FIFO Mode, several messages in a read queue (115) are processed simultaneously. The primary difference compared to the Fully Concurrent FIFO Mode is that the order of the messages in the read queue (115) is preserved in the write queue (120) after processing. The Protected Concurrent FIFO Mode is therefore a preferred mode in situations where the order of the messages in the read queue (115) is material. One example of use of the Fully Concurrent FIFO Mode is where the messages processed represent purchase orders and cancellations. A purchase order typically should be processed before the order can be cancelled. If the cancellation is output to the write queue (120) before a purchase order is output, two error conditions can occur. First, an exception may be thrown when no order is located to cancel. Second, the late arriving purchase order may be inadvertently processed even though the purchase order actually should have been cancelled. The race condition described above will typically not occur if the processing time is the same for each message type (e.g., for orders and cancellations). However, if the processing time for an order is longer than the processing time for a cancellation, the race condition can occur. The Protected Concurrent FIFO Mode is an alternate mode when it is desirable to maintain to the temporal order of the messages.

The Protected Concurrent FIFO Mode can be runtime implemented on the application server (102) or can be implemented on the message server (104). If runtime implemented on the application server (102), the Protected Concurrent FIFO Mode operates on the particular application server where the Protected Concurrent FIFO Mode has been runtime implemented. If implemented in the message server (104), the Protected Concurrent FIFO Mode works with multiple application servers (102) that connect to the message server (104).

In general, the Protected Concurrent FIFO Mode works as follows. The first processor (125) in the application server (102) reads a first message from the read queue (115) in the message server (104) and starts processing the message. Before processing is done, the second processor (130) reads a next message from the read queue (115) and starts processing the next message. In the Protected Concurrent FIFO Mode, commit signals are serialized, so the second message will not be fully committed to the write queue (120) until the first message has been committed. The first message will therefore always precede the second message in the write queue (120). As will be seen below, even though committing the second message has to wait until the first message has been committed, timesavings will result. The total time required to process the first and the second messages is roughly equal to the processing time of the first message, rather than the processing time of the first message plus the processing time of the second message, as would be the case if the messages were processed serially.

Figure 3:
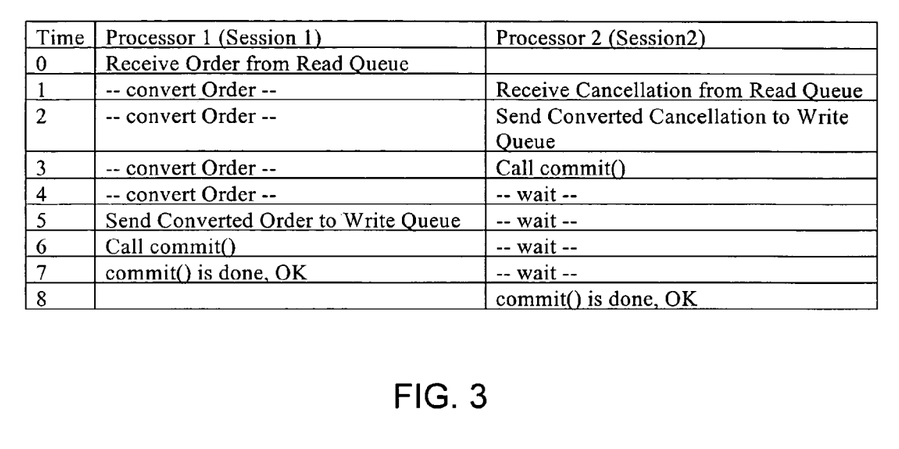
FIG. 3 shows a conventional operation of two processors in an application server in a protected concurrent FIFO mode.

The Protected Concurrent FIFO Mode applies to transacted sessions, including XA, which will be described in further detail below. From the client code's perspective, the commit function is blocked until all commits of preceding messages are finished, which is illustrated in FIG. 3 where the first message type is represented by a purchase order, and the second message type is represented by a cancellation. As can be seen in FIG. 3, the table shows a time sequence from time unit 0 through time unit 8 of the activities in two processors. The time intervals do not necessarily have the same duration, but are instead depend on the duration of the operation taking place during the time interval. During time 0, the first processor (125) receives a purchase order from the read queue (115). In time 1, the first processor (125) starts processing the purchase order, and the second processor (130) retrieves a cancellation from the read queue. Assuming that processing the cancellation is faster than processing a purchase order, the second processor (130) completes processing the second message while the first processor (125) is still processing the first message. The processed cancellation is then sent by the second processor (130) to the write queue (120) in time interval 2, and the second processor (130) calls a commit operation in time interval 3. The commit operation relating to the order cancellation waits for the first processor (125) to finish processing the order, which happens during time interval 4. In interval 5, the first processor (125) sends the processed (e.g., converted) order to the write queue (120). Commit for the order is called in time interval 6, and is completed in time interval 7. When the second processor (130) recognizes that the order has been committed, the second processor (130) completes the commit operation in time interval 8, and the sequence of operations ends.

During time interval 3, while the second processor (130) waits for the first processor (125) to finish processing the purchase order, the cancellation is held "invisibly" in the read queue (115) and the write queue (120) simultaneously. This "invisibility" can, for example, be accomplished by copying the original cancellation from the read queue (115), rather than actually removing the cancellation from the read queue (115), and placing the processed copy of the cancellation in the write queue (120). Other message consumers are also prevented from "seeing" and accessing the original message. When the message server (104) detects that the purchase order has been committed (i.e., all previous messages from the read queue (115) have been committed), the message server (104) sends an "ok to commit" signal to the application server (102) for the cancellation, which then completes the commit operation by permanently deleting the "invisible" cancellation (e.g. the original cancellation) from the read queue and making the "invisible processed cancellation" (e.g., the processed copy of the original cancellation) visible in the write queue (120).

The performance gain that can be achieved using Protected Concurrent FIFO Mode strongly depends on the order of messages and the number of processors. For example, consider a situation where there are two types of messages, A and B, the processing time of message type A (e.g., orders) is 50 time units, and the processing time of message type B (e.g., cancellations) is 10 time units. With a single processor in the application server (102), the processing sequence is as shown in Table 1 below.

TABLE 1

| Message | Accumulated Time |
|---------|------------------|
| A1  | 0   |
| B2  | 50  |
| B3  | 60  |
| A4  | 70  |
| B5  | 120 |
| B6  | 130 |
| B7  | 140 |
| B8  | 150 |
| B9  | 160 |
| A10 | 170 |
| B11 | 220 |
| A12 | 230 |
| B13 | 280 |
| B14 | 290 |
| B15 | 300 |
| A16 | 310 |
| A17 | 360 |
| B18 | 410 |
| B19 | 420 |
| B20 | 430 |
| A21 | 440 |
| B22 | 490 |
|     | 500 |

If three processors are used instead in the application server (102), the processing sequence is as shown in Table 2 below:

TABLE 2

| Accumulated time | Processor 1 | Processor 2 | Processor 3 |
|---|---|---|---|
| 0   | A1  | B2  | B3  |
| 50  | A4  | B5  | B6  |
| 100 | B7  | B8  | B9  |
| 110 | A10 | B11 | B12 |
| 160 | B13 | B14 | B15 |
| 170 | A16 | A17 | B18 |
| 220 | B19 | B20 | A21 |
| 230 | B22 |     |     |
| 270 |     |     |     |

As can be seen by comparing the processing times in tables 1 and 2, the use of three processors brings down the total processing time to 270 time units instead of 500 time units, that is, a gain of 230 time units is achieved.

Further time gains can be achieved if the messages in the read queue (115) are grouped by type, so that all A-type messages are processed first, followed by processing of all B-type messages. In the case of a single processor, the total processing time will be the same as in table 1 above, i.e., 500 time units, as can be seen in Table 3 below.

TABLE 3

| Message | Accumulated Time |
|---------|------------------|
| A1  | 0   |
| A2  | 50  |
| A3  | 100 |
| A4  | 150 |
| A5  | 200 |
| A6  | 250 |
| A7  | 300 |
| B8  | 350 |
| B9  | 360 |
| B10 | 370 |
| B11 | 380 |
| B12 | 390 |

TABLE 3-continued

| Message | Accumulated Time |
|---|---|
| B13 | 400 |
| B14 | 410 |
| B15 | 420 |
| B16 | 430 |
| B17 | 440 |
| B18 | 450 |
| B19 | 460 |
| B20 | 470 |
| B21 | 480 |
| B22 | 490 |
|  | 500 |

However, if the messages are grouped by type, but three processors are used, the time gain becomes significant, as can be seen from Table 4 below.

TABLE 4

| Accumulated Time | Processor 1 | Processor 2 | Processor 3 |
|---|---|---|---|
| 0 | A1 | A2 | A3 |
| 50 | A4 | A5 | A6 |
| 100 | A7 | B8 | B9 |
| 150 | B10 | B11 | B12 |
| 160 | B13 | B14 | B15 |
| 170 | B16 | B17 | B18 |
| 180 | B19 | B20 | B21 |
| 190 | B22 |  |  |
| 200 |  |  |  |

As can be seen in Table 4, the total processing time when the messages are grouped by type, is 200 time units, which is a further gain of 70 time units as compared to the case discussed with regards to table 2 above, where three processors also were used but the messages were not sorted in any particular order in the read queue (115).

A number of special situations can occur during processing of the messages in the read queue (115) for various reasons. Two examples of special situations are rollbacks and deadlocks, which will be explained below.

A rollback situation may occur as a result of a failure during the processing of messages in the application server (102) during a transaction. If an error failure is detected while performing a transaction, the message producers and message consumers involved in the transaction are typically automatically rolled back to the state that existed at a previous commit operation. Expressed differently, the failed operation can be canceled.

Figure 4:
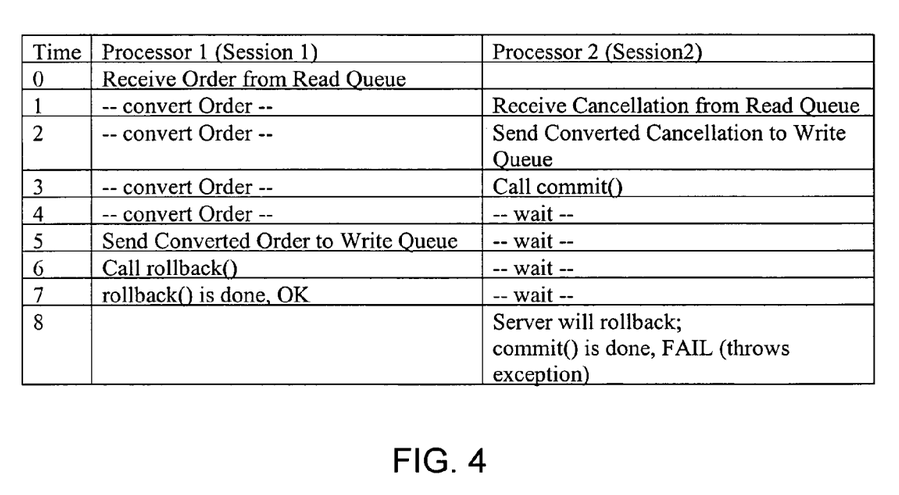
FIG. 4 shows the operation of the two processors in the application server in a protected concurrent FIFO mode in the event of a rollback situation.

One type of problem that may occur during a rollback operation is shown in FIG. 4. As can be seen in FIG. 4, a rollback can cause an exception to be thrown in pending commits in the following way. In time interval 0, the first processor (125) receives an order from the read queue (115). The first processor (125) starts converting the order in time interval 1, and at the same time, the second processor (130) receives a cancellation of the order from the read queue (115). The second processor (130) sends the converted cancellation to the write queue (120) during time interval 2, and calls commit during time interval 3. In time interval 4, the second processor (130) waits for the first processor (125) to finish processing the order. The first processor (125) finishes converting the order in time interval 5, and sends the processed order to the write queue (120). A failure then occurs in the application server (102) and a rollback operation is called under time interval 6. In the meantime, the second processor (130) is still waiting for the first processor (125) to complete the second processor's operations. In time interval 7, the first processor (125) completes the rollback and signals ok, while the second processor (130) is still waiting. The second processor (130) receives a signal to complete the commit operation in time interval 8, which results in an exception being thrown because there is no order to cancel in the write queue (120). The example above shows that there are cases where a commit fails and the transaction is left open. In one implementation, the queue management system (100) includes an exception engine (135) that identifies whether a commit operation throws an exception. A timer (145) can also be included in the queue management system (100), and operates when a rollback is detected, as will be seen below. If the queue management system (100) detects that a commit operation throws an exception, the application code in the application server (102) calls a rollback. In the example just described, the second processor (102) calls a rollback and the above problematic situation is thereby avoided. If a message is rolled back, pending commits will not result in an error. Instead, the pending commits waits until the message is redelivered and re-committed, or until the pending commits time out due to a commit expiration time that can been set for the commit operation.

The queue management system (100) in FIG. 1 also includes mechanisms for handling problems that may occur during a "deadlock situation." A deadlock situation may occur when multiple messages are received in a same session. The deadlock situation can be understood by way of the following example in which three messages A, B, C are resident in the read queue (115). The messages are processed as follows: Session 1 commits but will be blocked because one of the messages that are part of the transaction, namely message C, is blocked by message B in session 2. In turn, session 2 will be blocked because message B is blocked by message A in session 1.

In one implementation, a deadlock situation of the type discussed above is avoided by disallowing a client (e.g., a processor in the application server) to consume more than one message in a same transaction without committing a previous one. In another implementation, a deadlock situation is avoided by providing a deadlock engine (140) (e.g., as part of the queue management system (100)) that looks for any deadlocks and throws an exception to a client if a deadlock is detected. In yet another implementation, a timer (145) (e.g., as part of the queue management system (100)) is used, such that a commit operation does not happen if the commit operation takes more than a specified time period and all blocked messages are failed, i.e., rolled back.

Reading from the read queue (115) and writing to the write queue (120) can advantageously occur in a same transaction. Reading from the read queue (115) and writing to the write queue (120) can advantageously be part of a same session. If the read queue (115) and the write queue (120) are part of the same session, the read queue (115) and the write queue (120) can advantageously be located in the same message server, e.g., message server (104). For the purpose of maintaining the original order of the messages in such as situation, in one implementation the queue management system (100) services the write queue (120) before the read queue (115).

As was discussed above, in some implementations the write queue (120) can be a database. Writing in other systems than JMS queues is typically not based on the moment of commit, but on the moment of the write-action. For instance, the writing of a row in a table in a database typically is determined instantaneously at a first write action, not at the moment when the transaction is committed. If the read queue (115) and the write queue (120) reside on different servers and one is a JMS queue and the other is a database, problems can occur unless XA is used. XA is a system level interface between distributed transaction processing (DTP) software components, as defined by the Open Group vendor consortium. XA requires a specialized transaction manager or a change to the client API code and the client that uses the message server (104). The Protected Concurrent FIFO Mode is therefore preferred when there is read queue (115) and a write queue (120) that both reside on the same message server (104).

All of the above examples have described situations in which there is only a single read queue (115). In one implementation, the Protected Concurrent FIFO Mode allows multiple read queues (115) to be used and can preserve a time ordering of individual messages across the multiple read queues (115), such that messages are committed based on when the messages were created rather than on the messages' locations in a given read queue (115). For example, in the purchase order and cancellation scenario, there can be one read queue (115) that contains only the purchase orders, and another read queue (115) that contains only the cancellations. By committing the purchase orders and cancellations on a time ordering basis rather than on a queue basis, the problems of having a cancellation preceding an order can be avoided.

Figure 5:
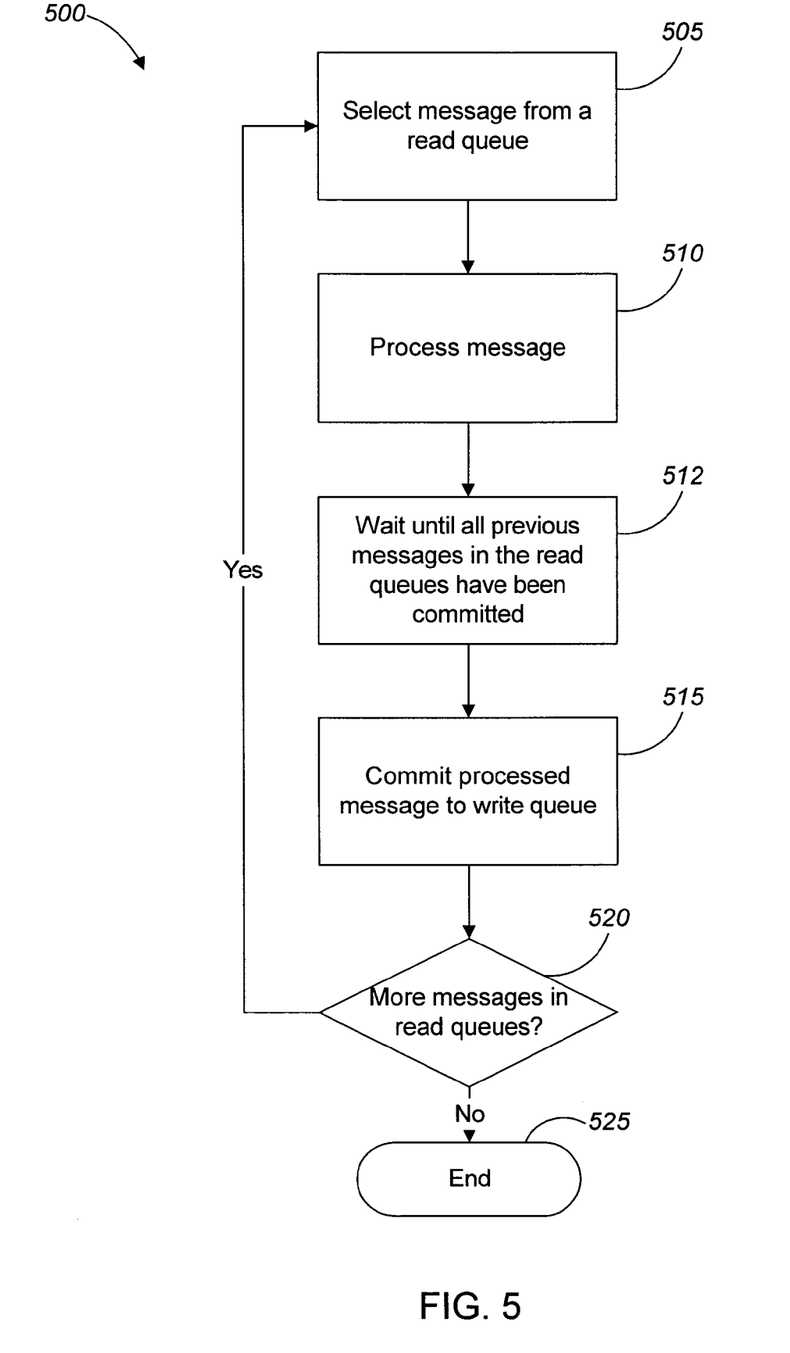
FIG. 5 shows a flow chart showing the operation of the system in a fully serialized mode with multiple write queues.

FIG. 5 shows a process (500) for operating on multiple read queues (115). The queue management system (100) starts by selecting a message between all the read queues containing messages to be processed (step 505). The queue management system (100) then processes the message as described above (step 510). After the message has been processed, the queue management system (100) determines whether all previous messages in the read queues (115) have been processed (step 512). Here, previous messages refer to messages that were created earlier than the currently processed message. The process can, for example, compare time stamps included in the messages during this determination. Furthermore, because all read queues (115) in this implementation are FIFO queues, the process only needs to look at one element in each remaining read queue (115) to make the determination. After the process has determined that there are no earlier messages in any of the read queues (115), the process writes the processed message to a write queue (120) (step 515). In some implementations there can be multiple write queues (120) and the queue management system (100) can write the processed message to a particular write queue, in accordance with predefined instructions in the received message or as provided in the queue management system (100). When the message has been written to the write queue (120), the process determines whether there are any more messages in the read queues (step 520). If there are more messages, the process returns to step 505 and performs steps 505 through 520 as described above. If there are no more messages to process, the process ends (step 525). In an alternative implementation there can be multiple read queues that can be processed on a queue-by-queue basis, rather than processing multiple queues simultaneously. For example, if one read queue contains purchase orders only, and another read queue contains cancellations only, all the messages in the purchase order read queue can be processed before all the messages in the cancellation read queue are processed.

Another feature of the Protected Concurrent FIFO Mode is the locking key property feature. The locking key property feature allows serialization based on a characteristic of a message in the read queue (115). Messages can have any number of key-value pairs specified directly or indirectly by the producers. The locking key property allows for an evaluation of one or more of the key-value pairs. The queue management system serializes the processing of messages by consumers, such that the sequence in which messages with the same locking key property are read-committed is the same as the original message sequence. The queue management system accomplishes the serialization processing by enforcing one of the following three policies. In the first policy, a consumer cannot read any message until all messages with the same locking key property prior in the sequence have been read-committed. In the second policy, a consumer cannot read-commit any message until all messages with the same locking key property prior in the sequence have been read-committed. In the third policy, a consumer can read and commit messages, but skips messages that have the same locking key property as a particular message that has been read but has not been read-committed. The consumers can read and commit skipped messages as soon as the particular message has been read-committed.

Figure 6:
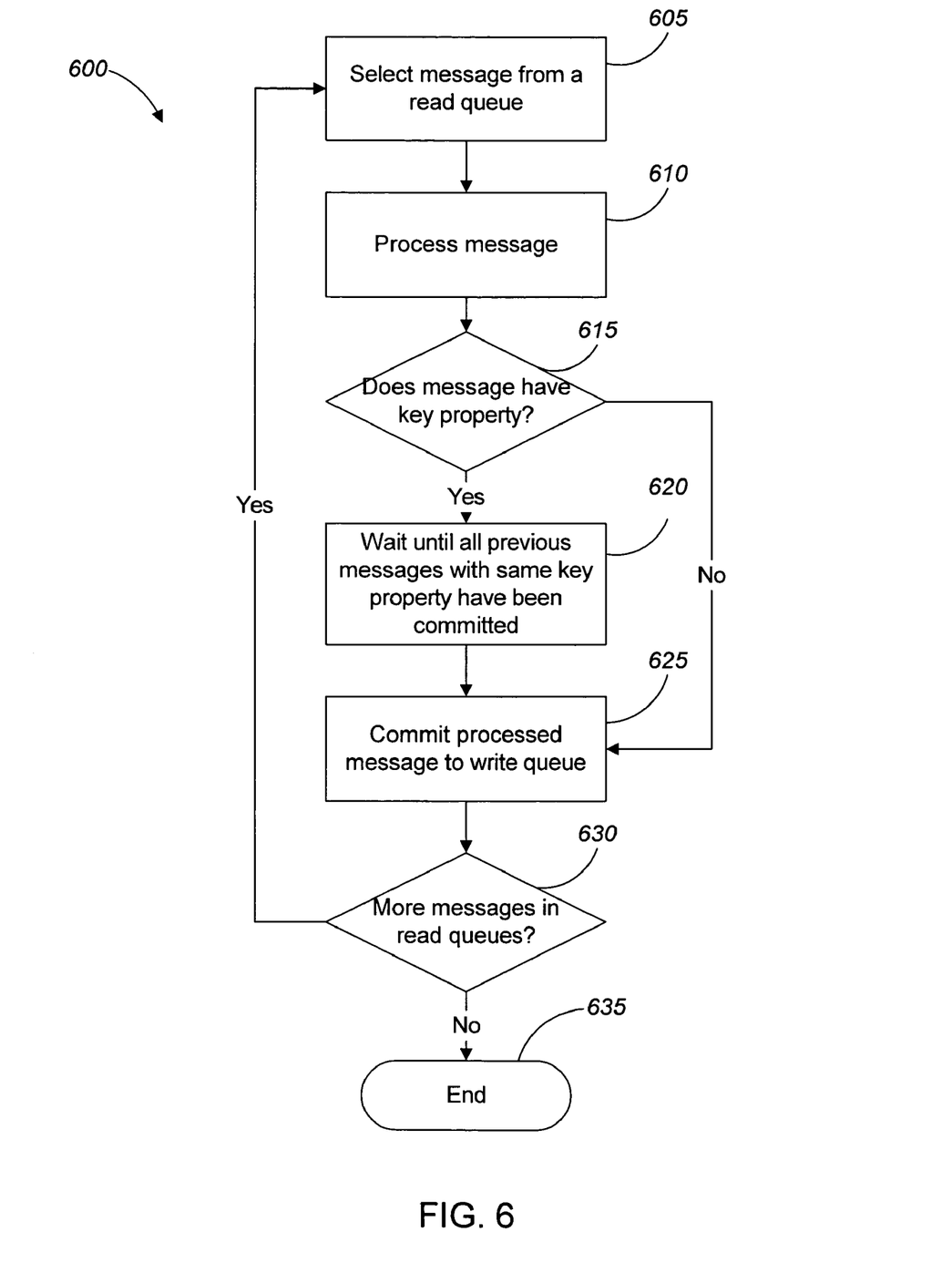
FIG. 6 shows a flow chart showing the operation of the system in a fully serialized mode when key locking properties are used.

FIG. 6 shows one implementation of a process (600) for processing messages having a locking key property. As can be seen in FIG. 6, the process begins by receiving or retrieving a message from the read queue (115) (step 605). The message is then processed as describe above (step 610). After processing the message, the process determines whether the message has a desired locking key property (step 615). For example, in the case of purchase orders and cancellations the message can have an additional identifier, such as a customer number that serves as the locking key property.

If the message has the desired locking key property, the queue management system (100) determines whether all previous messages with the same key locking property have been processed (step 620). Here, previous messages refer to messages that were created earlier than the currently processed message. If there is only one read queue (115) that is a FIFO queue, then all previous messages will have been processed, which follows from the definition of a FIFO queue. If there are several read queues (115), the process can, for example, compare time stamps included in the messages, as was described above. After the process has determined that there are no earlier messages with the same locking key property, the process commits the processed message to a write queue (120) (step 625). If it is detected in step 620 that the message does not have the locking key property, the process directly continues to step 625 and commits the message to the write queue (120).

When the message has been written to the write queue (120), the process determines whether there are any more messages in the read queues (step 630). If there are more messages, the process returns to step 605 and performs steps 605 through 630 as described above. If there are no more messages to process, the process ends (step 635).

Fully Serialized FIFO Mode

In the Fully Serialized FIFO Mode, consumers read messages from a destination in the queue management system in a well-defined sequence. The sequence is typically the same as the sequence in which the messages were write-committed to the destination. The queue management system serializes the messages that are read by consumers such that a consumer cannot read a message until the previous message in the sequence has been read-committed. The Fully Serialized FIFO mode will now be explained in further detail.

Referring again to FIG. 1, in the Fully Serialized FIFO Mode, the first processor (125) reads a first message (105) from the read queue (115) and starts processing the message. In this mode, the second processor (130) cannot receive or retrieve a second message (110) from the read queue (115) until the first processor (125) has committed the first message. The total processing time is roughly the same as the time for processing each message. The Fully Serialized FIFO Mode can therefore be a preferred mode in situations where the order of messages in the read queue (115) has to be maintained in the write queue (120), and where there is a need for backup processors, should one or more processors experience problems.

Because the messages are processed one by one, there are no special considerations that need to be made compared to when a single processor only is used. The Fully Serialized FIFO Mode can be implemented in the message server (104) and thus can work across several clients (e.g., application servers (102)). The Fully Serialized FIFO Mode supports transacted sessions and XA sessions.

Just like in the Protected Concurrent FIFO Mode, the Fully Serialized FIFO mode allows multiple read queues (115) to be used and can preserve a time ordering of individual messages across the multiple read queues (115), such that messages are committed based on when the messages where created rather than on the messages' locations in a given read queue (115). The Locking Key property feature can also be used in the Fully Serialized FIFO mode in a similar way to what was described above for the Protected Concurrent FIFO Mode.

The invention can be implemented in digital electronic circuitry, or in computer hardware, firmware, software, or in combinations of them. The invention can be implemented as a computer program product, i.e., a computer program tangibly embodied in a machine-readable storage device for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A method, for processing an ordered sequence of elements in one or more queues, comprising:

receiving a first element from one or more queues at a first processor, the first element having a first position in a temporal order;

processing the first element to generate a first processed element;

receiving a second element from the one or more queues at a second processor, the second element having a second position in the temporal order which is after the first position;

processing the second element to generate a second processed element, wherein the second processed element is generated before the first processed element is generated; and committing the first and second processed elements to a write queue by:

determining that the first element precedes the second element in the temporal order; and in response to determining that the first element precedes the second element in the temporal order, ensuring that the second processed element is committed to the write queue after the first processed element is committed to the write queue even though the second processed element was generated before the first processed element was generated.

2. The method of claim 1, wherein:
receiving the first and second elements includes receiving the first and second elements from one queue of the one or more queues and the first and second elements are in the temporal order in the one queue.

3. The method of claim 1, wherein:
receiving the first element includes receiving the first element from a first queue;
receiving the second element includes receiving the second element from a second queue, wherein the second element was written into the second queue after the first element was written to the first queue, thereby defining the temporal order; and
committing the first and second processed elements includes committing the first processed element to the write queue prior to committing the second processed element to the write queue such that the temporal order is maintained.

4. The method of claim 1, wherein ensuring comprises:
determining whether any processed elements, including the first processed element, which are generated as a result of processing elements having positions in the temporal order that precede the second position, remain to be committed to the write queue; and
committing the second processed element to the write queue only if it is determined that there are no more processed elements, generated as a result of processing elements having positions in the temporal order that precede the second position, that remain to be committed.

5. The method of claim 1, wherein committing includes:
monitoring the committing of the first and second processed elements to determine whether a committing operation has failed; and
if a committing operation has failed, throwing an exception for an associated processed element.

6. The method of claim 1, wherein:
the first and second elements are electronic data interchange messages.

7. The method of claim 6, wherein:
the electronic data interchange messages represent one or more of orders and cancellations.

8. The method of claim 1, wherein:
the write queue is an enterprise resource planning queue.

9. The method of claim 1, further comprising:
detecting a deadlock situation in which two or more processed elements are blocked from being committed to the write queue; and
throwing an exception if a deadlock situation is detected.

10. The method of claim 1, wherein:
each processor is operable to process only one element per transaction.

11. The method of claim 1, wherein the write queue is a database.

12. The method of claim 1, further comprising:
identifying a locking key property for at least one of the received first or second elements; and
if at least one of the first or second elements has a predetermined locking key property, committing the first and second processed elements serially to the write queue such that a temporal order between all processed elements with the predetermined locking key property is maintained in the write queue regardless of the first and second durations of the first and second processing times.

13. A computer program product for processing an ordered sequence of elements in one or more queues, comprising instructions operable to cause a programmable processor to:
receive a first element from one or more queues at a first processor, the first element having a first position in a temporal order;
process the first element to generate a first processed element; receive a second element from the one or more queues at a second processor, the second element having a second position in the temporal order which is after the first position;
processing the second element to generate a second processed element, wherein the second processed element is generated before the first processed element is generated; and
committing the first and second processed elements to a write queue by:
determining that the first element precedes the second element in the temporal order; and
in response to determining that the first element precedes the second element in the temporal order, ensuring that the second processed element is committed to the write queue after the first processed element is committed to the write queue even though the second processed element was generated before the first processed element was generated.

14. The computer program product of claim 13, wherein the instructions to receive the first and second elements includes instructions to:
receive the first and second elements from one queue of the one or more queues, wherein the first and second elements are in the temporal order in the one queue.

15. The computer program product of claim 13, wherein:
the instructions to receive the first element include instructions to receive the first element from a first queue;
the instructions to receive the second element include instructions to receive the second element from a second queue, wherein the second element was written into the second queue after the first element was written to the first queue, thereby defining the temporal order; and
the instructions to commit the first and second processed elements include instructions to commit the first processed element to the write queue prior to committing the second processed element to the write queue such that the temporal order is maintained.

16. The computer program product of claim 13, wherein ensuring comprises:
determining whether any processed elements, including the first processed element, which are generated as a result of processing elements having positions in the temporal order that precede the second position, remain to be committed to the write queue; and
committing the second processed element to the write queue only if it is determined that there are no more processed elements, generated as a result of processing elements having positions in the temporal order that precede the second position, that remain to be committed.

17. The computer program product of claim 13, wherein the instructions to commit includes instructions to:
monitor the committing of the first and second processed elements to determine whether a committing operation has failed; and
if a committing operation has failed, throw an exception for an associated processed element.

18. The computer program product of claim 13, wherein: the first and second elements are electronic data interchange messages.

19. The computer program product of claim 18, wherein: the electronic data interchange messages represent one or more of orders and cancellations.

20. The computer program product of claim 13, wherein: the write queue is an enterprise resource planning queue.

21. The computer program product of claim 13, further comprising instructions to:
   detect a deadlock situation in which two or more processed elements are blocked from being committed to the write queue; and
   throw an exception if a deadlock situation is detected.

22. The computer program product of claim 13, wherein: each processor is operable to process only one element per transaction.

23. The computer program product of claim 13, wherein the write queue is a database.

24. The computer program product of claim 13, further comprising instructions to:
   identify a locking key property for at least one of the received first or second elements; and
   if at least one of the first or second elements has a predetermined locking key property, commit the first and second processed elements serially to the write queue, such that a temporal order between all processed elements with the predetermined locking key property is maintained in the write queue regardless of the first and second durations of the first and second processing times.

* * * * *

UNITED STATES PATENT AND TRADEMARK OFFICE
CERTIFICATE OF CORRECTION

PATENT NO. : 7,644,197 B1  Page 1 of 1
APPLICATION NO. : 10/871590
DATED : January 5, 2010
INVENTOR(S) : Waldorf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this

Sixteenth Day of November, 2010

David J. Kappos
*Director of the United States Patent and Trademark Office*